United States Patent
Chu et al.

(10) Patent No.: US 9,450,743 B1
(45) Date of Patent: Sep. 20, 2016

(54) DUPLEX MODE ENABLING FRAME HEADER

(71) Applicant: MARVELL INTERNATIONAL LTD., Hamilton (BM)

(72) Inventors: Liwen Chu, San Ramon, CA (US); Hui-Ling Lou, Sunnyvale, CA (US); Hongyuan Zhang, Fremont, CA (US)

(73) Assignee: MARVELL INTERNATIONAL LTD. (BM)

( * ) Notice: Subject to any disclaimer, the term of this patent is extended or adjusted under 35 U.S.C. 154(b) by 3 days.

(21) Appl. No.: 14/554,144

(22) Filed: Nov. 26, 2014

Related U.S. Application Data

(60) Provisional application No. 61/909,067, filed on Nov. 26, 2013.

(51) Int. Cl.
*H04L 5/14* (2006.01)
*H04L 29/06* (2006.01)

(52) U.S. Cl.
CPC ............ *H04L 5/1453* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2009/0067352 | A1* | 3/2009 | Wang | H04W 48/12 370/280 |
| 2015/0124784 | A1* | 5/2015 | Choi | H04W 74/04 370/336 |
| 2015/0171892 | A1* | 6/2015 | Yu | H03M 9/00 370/254 |

* cited by examiner

*Primary Examiner* — Afshawn Towfighi

(57) ABSTRACT

Apparatus, methods, and other embodiments associated with duplex mode enabling frame headers are described. According to one embodiment, an apparatus includes a transceiver and duplex logic. The duplex logic is configured to receive data to be transmitted by the transceiver to a device and generate a header for a frame. The header includes at least one bit that encodes information used to enable full duplex communication with the device. The duplex logic is configured to provide the frame to the transceiver to transmit the frame.

20 Claims, 12 Drawing Sheets

US 9,450,743 B1

DUPLEX MODE ENABLING FRAME HEADER

CROSS REFERENCE TO RELATED APPLICATIONS

This patent disclosure claims the benefit of U.S. Provisional Application Ser. No. 61/909,067 filed on Nov. 26, 2013, which is hereby wholly incorporated by reference.

BACKGROUND

In true full duplex communication, a device both sends and receives data simultaneously in the same channel and frequency band. Many older devices simulate full duplex communication using either frequency division multiplexing or time division multiplexing. As wireless technology evolves, more wireless devices support true full duplex communication.

FIGS. 1A and 1B illustrate the difference between half duplex and full duplex communication between two stations and an access point in a wireless local area network (WLAN). Station 1 and the access point are both full duplex capable, while station 2 is not full duplex capable. A full duplex capable device is a device that is operable to simultaneously send and receive data in the same channel and frequency band. As shown in FIG. 1A, in half duplex communication, after waiting a backoff period to ensure that no other devices are communicating in a channel, station 1 determines that it can grant itself a transmission opportunity (TXOP) which is a bounded time interval during which station 1 can send as many frames as possible to the access point. When the TXOP begins, station 1 sends a frame or frames containing "Data 1" to the access point. Station 1 determines how many frames it can send based on the duration of the TXOP. When the access point has successfully received the frames, the access point sends an acknowledgement frame (ACK) to station 1.

To send data to station 1 and station 2, after waiting a backoff period to ensure that no other devices are communicating in a channel, the access point determines that it can grant itself a TXOP. When the TXOP begins, the access point sends a frame or frames containing "Data 2" to station 1, receives an ACK frame from station 1 and then sends a frame or frames containing "Data 3" to station 2. When station 2 has successfully received the frames, station 2 sends an ACK to the access point. The access point determines how many frames it can send to station 1 and station 2 based on the duration of the TXOP.

FIG. 1B illustrates how allowing station 1 and the access point to utilize their full duplex communication capability saves time and overhead. Although FIG. 1B and other figures may not show the PHY header, it is understood that when a frame is transmitted, the frame is always carried in a Physical Protocol Data Unit (PPDU) (e.g., the data portion of the PPDU) and follows the PHY header of the PPDU as shown in FIGS. 3 and 4. After waiting a backoff period to ensure that no other devices are communicating in a channel, station 1 determines that it can grant itself a TXOP. When the TXOP begins, station 1 sends a frame or frames containing "Data 1" to the access point. Station 1 determines how many frames it can send based on the duration of the TXOP. At the same time, the access point sends a frame or frames containing "Data 2" to station 1. The access point determines how many frames it can send based on the duration of the TXOP. When the access point has successfully received the frames, the access point sends an ACK to station 1. When station 1 has successfully received the frames, station 1 sends an ACK to the access point. Note how much time is saved (e.g., the time for the separate transmission of Data 2 to station 1) when full duplex mode is used instead of half duplex mode.

SUMMARY

In general, in one aspect this specification discloses an apparatus. The apparatus includes a transceiver and duplex logic. The duplex logic is configured to receive data to be transmitted by the transceiver to a device and generate a header for a frame. The header includes at least one bit that encodes information used to enable full duplex communication with the device. The duplex logic is configured to provide the frame to the transceiver to transmit the frame.

In general, in another aspect, this specification discloses a method. The method includes receiving data to be transmitted by a transceiver to a device; generating a header for a frame, where the header includes at least one bit that encodes information used to enable full duplex communication with the device; and providing the frame to the transceiver to transmit the frame.

In general, in another aspect, this specification discloses an integrated circuit device. The integrated circuit device includes a first integrated circuit including a transceiver configured to operate in either half duplex or full duplex mode and a second integrated circuit including duplex logic. The duplex logic is configured to: i) encode and decode full duplex communication related information in a header of a frames transmitted and received by the transceiver; and ii) control the transceiver to operate in either full duplex or half duplex mode, based at least in part, on full duplex communication related information in the frames received by the transceiver.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

In order for two wireless devices to communicate in full duplex mode, each device must be able to communicate a desire to engage in full duplex communication with the other device. It is also important for the devices to be able to communicate the length of a time window (e.g., TXOP) during which they will be able to communicate in full duplex mode without interference from other devices. This is so that each device can determine the amount of data that can be sent during the full duplex communication.

Described herein are examples of systems, methods, and other embodiments associated with encoding duplex communication related information (e.g., full duplex capability, TXOP length, and so on) in a PHY header or a frame header to enable full duplex communication of frames between wireless devices. For the purposes of this description, a "duplex frame" is any frame that includes duplex communication related information in the frame header and/or in the PPDU header of the PPDU that carries the "duplex frame."

Figure 1A:
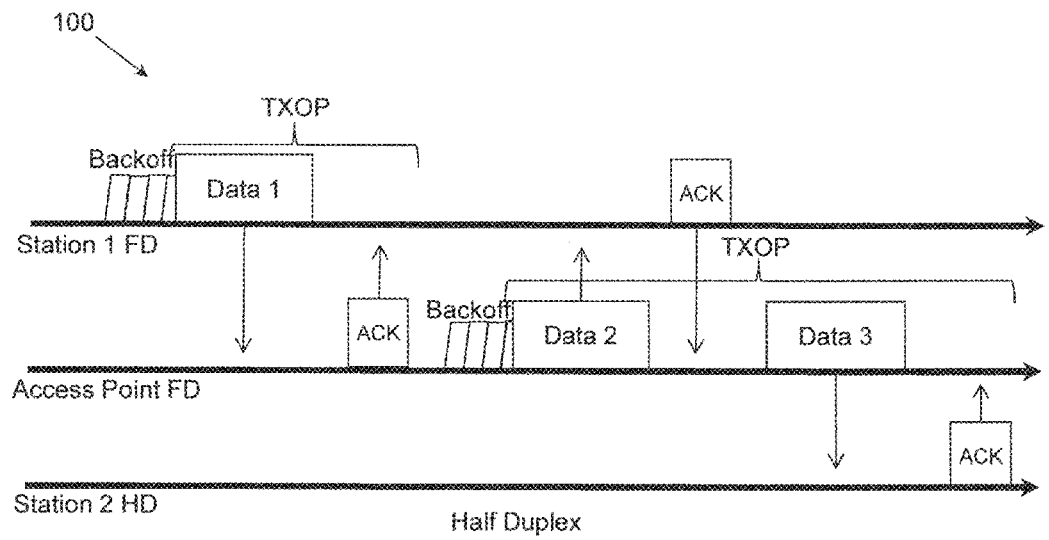
FIGS. 1A and 1B illustrate examples of half duplex and full duplex communication, respectively.
Figure 1B:
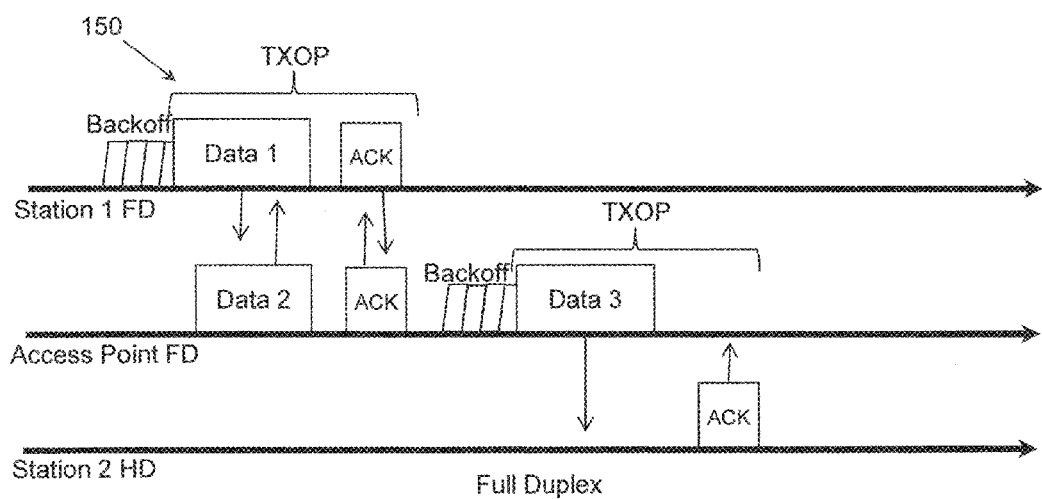
Figure 2:
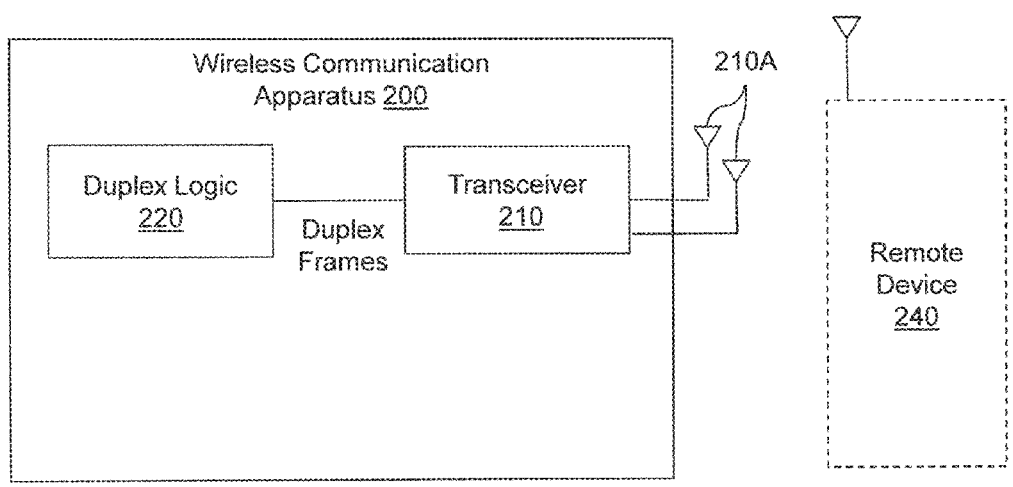
FIG. 2 illustrates one embodiment of a wireless communication apparatus that communicates in full duplex mode using duplex frames.

With reference to FIG. 2, one embodiment of a wireless communication apparatus 200 is shown that sends and receives duplex frames. The apparatus 200 includes a transceiver 210 and duplex logic 220. The transceiver 210 includes a transmitting portion and a receiving portion (not shown). The transceiver 210 is coupled to at least two antennas 210A through which frames, including duplex frames, are sent to and received from a remote device 240. The duplex logic 220 is configured to encode and decode duplex communication related information in a duplex frame header. The duplex logic 220 is also configured to control the transceiver 210 to operate in either full duplex or half duplex mode, based, at least in part, on duplex communication related information in the duplex frames' headers. In one embodiment, the apparatus 200 is implemented on a chip including one or more integrated circuits configured to perform one or more of the functions described herein.

A "duplex frame" is any frame that includes duplex communication related information in the frame header and/or in the PPDU header of the PPDU that carries the "duplex frame." Two different embodiments of duplex frames will be described herein: i) a null data packet (NDP) duplex sync frame with duplex communication information in the frame header, and ii) a duplex data frame with duplex communication information in the PHY and/or MAC header of a frame that includes data.

There are two steps during which a device can communicate the device's capability and desire to engage in full duplex communication with another device: i) explicit communication of full duplex capability through a management frame or ii) use of a duplex frame to communicate usage of duplex operation in a TXOP. Using management frames, a duplex station or access point (STA/AP) can communicate that the device supports full duplex operation in a management frame, such as an Extended Capabilities element in an Associate Request/Response, a Beacon, or a Probe Request/Response. When the TXOP holder decides to use full duplex communication with a TXOP responder that supports duplex operation, the TXOP holder sends a duplex frame as the first frame of a TXOP. When the TXOP responder receives a duplex frame as the first frame in the TXOP, the TXOP responder understands that the TXOP responder should use full duplex communication.

NDP duplex sync frames are exchanged in a handshake type operation after which standard Physical Layer Convergence Procedure (PLCP) PPDUs can be exchanged in full duplex mode. A PPDU includes an 802.11 Media Access Control (MAC) data frame (MPDU) and PLCP header fields. An NDP is a data-less frame (e.g., non-PPDU) that includes only a PLCP header and is used to communicate training symbols for beamforming purposes. Thus, an NDP does not include a MAC frame. An NDP duplex sync frame is another type of NDP frame where MAC layer information is put in PHY SIG (e.g., Type/Subtype, Duration, the following PPDU length, and so on). The NDP duplex sync frame can decrease MAC overhead and improve robustness.

Figure 3:
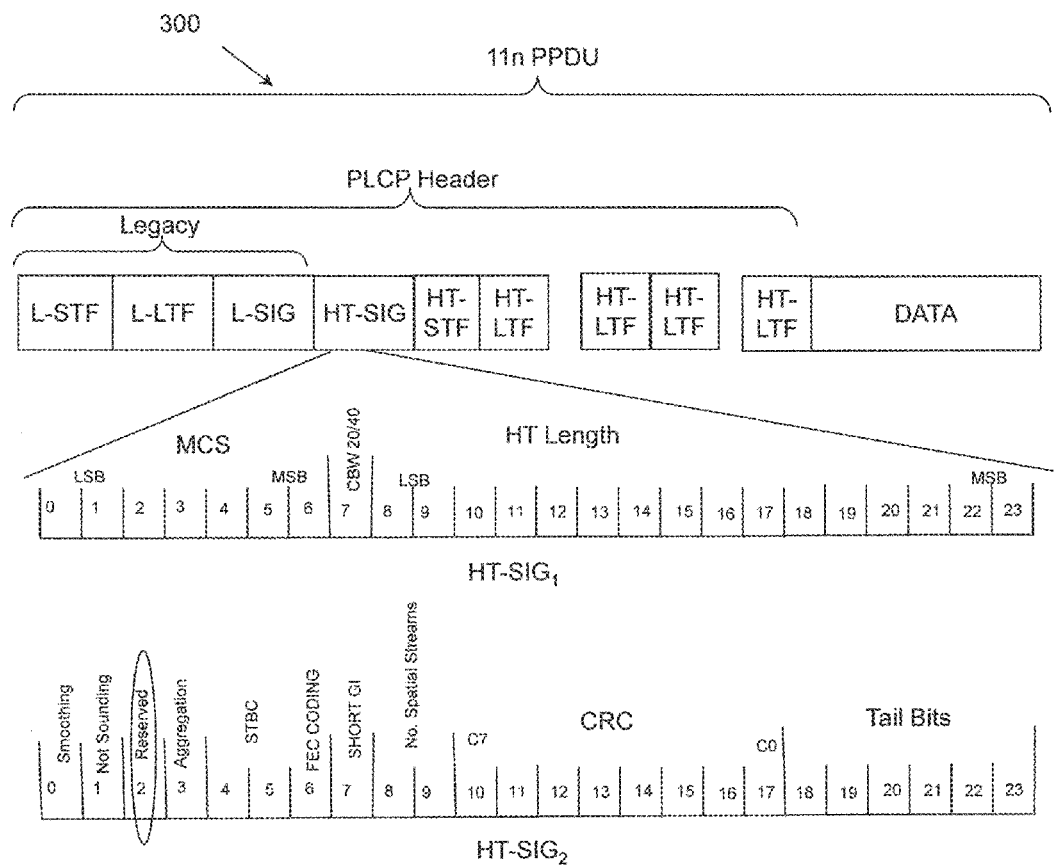
FIG. 3 illustrates an 802.11n frame Physical Layer Convergence Procedure (PLCP) header.

FIG. 3 illustrates an 802.11n PPDU 300 with the High Throughput Signal (HT-SIG) field in exploded view. The PPDU includes data and a PLCP header that conforms to the 802.11n protocol. The data portion carries one or more frames. The PLCP header includes a legacy portion that is used to communicate with older devices configured according to earlier versions of 802.11. In the legacy portion, the L-STF field is a short training frame and the L-LTF field is a long training frame, both used in channel sounding. The L-SIG field communicates either the length of the entire TXOP or the individual PPDU, depending on whether L-SIG and the frame length in HT-SIG indicate the same end time of the PPDU. If L-SIG indicates a longer PPDU length than HT-SIG, L-SIG protection is used.

The HT-SIG field includes two components HT-SIG$_1$ and HT-SIG$_2$ which contain bits that communicate various aspects of how the signal is being encoded. For example, the HT-SIG field includes bits that identify the modulation and coding scheme (MCS) in use by the device transmitting the packet. The MCS value summarizes the number of spatial streams, the modulation type and the coding rate that is possible when connecting to the transmitting device. The MCS will depend on variables such as hardware design and local interference. If a wireless connection cannot be maintained, i.e. there are too many errors being experienced on the link, the MCS value can be lowered. A lower MCS value will reduce the error rate (by selecting a more forgiving modulation type/coding rate) but will come at the price of a slower data rate. In general, the lower the MCS value, the more reliable the wireless transmission becomes.

The HT-SIG field also includes a single reserved bit in bit number 2 of the HT-SIG$_2$ component. As will be described in more detail with respect to FIGS. 5A-5C, in an 802.11n duplex packet, this reserved bit is used to encode whether or not the transmitting device is full duplex capable.

Figure 4:
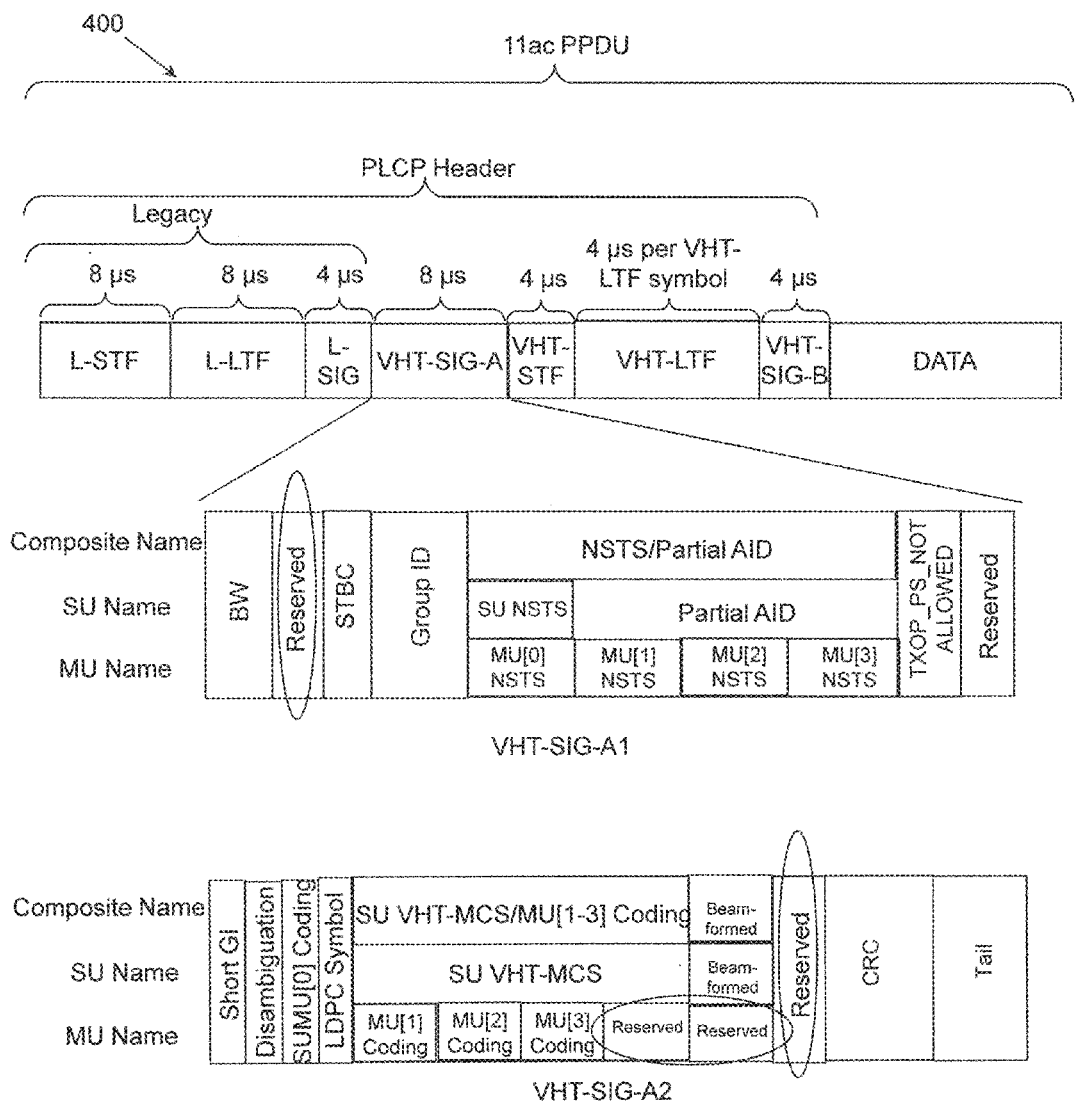
FIG. 4 illustrates an 802.11ac frame Physical Layer Convergence Procedure (PLCP) header.

FIG. 4 illustrates an 802.11ac PPDU 400 with the Very High Throughput Signal A (VHT-SIGA) field in exploded view. The PPDU 400 includes data and a PLCP header that conforms to the 802.11ac protocol. The data portion carries one or more frames. The PLCP header includes the legacy portion that is used to communicate with older devices configured according to earlier versions of 802.11. Recall that in the legacy portion, the L-STF field is a short training frame and the L-LTF field is a long training frame, both used in channel sounding. The L-SIG field communicates either the length of the entire TXOP or the individual PPDU, depending on the device.

The VHT-SIG field includes two components VHT-SIG-A1 and VHT-SIG-A2 which contain bits that communicate various aspects of how the signal is being encoded. For example, the VHT-SIG-A2 field includes bits that identify the modulation and coding scheme (MCS) in use by the device transmitting the packet. The VHT-SIG fields also include a several reserved bits, which are circled. As will be described in more detail with respect to FIGS. 6A-6B, in an 802.11ac duplex packet, these reserved bits are used to encode whether or not the transmitting device is full duplex capable as well as other duplex communication related information.

Figure 5A:
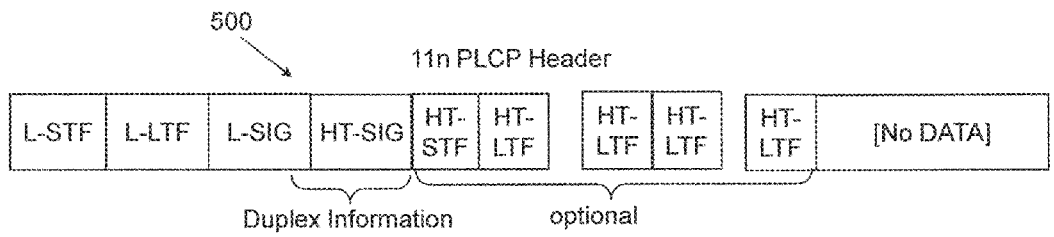
FIGS. 5A-5C illustrate various embodiments of a duplex frame that comprises a null data packet (NDP) sync frame.
Figure 5B:
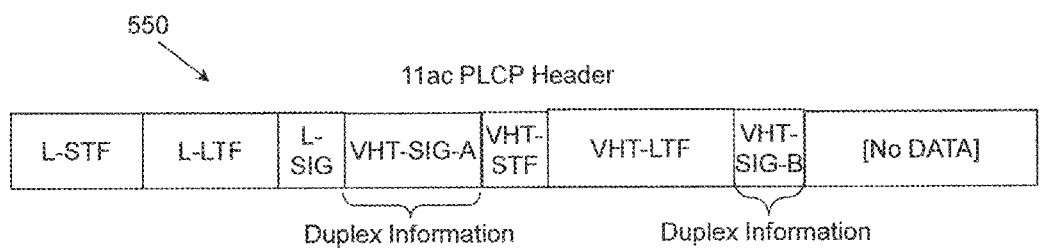
Figure 5C:
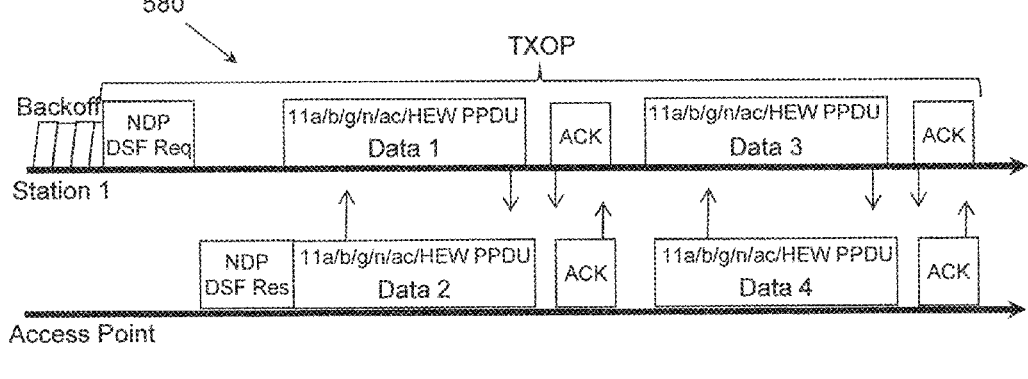

FIGS. 5A-5C illustrate various embodiments of an NDP duplex sync frame. FIG. 5A illustrates an NDP duplex sync frame 500 constructed in accordance with 802.11n. The NDP duplex sync frame 500 includes a PLCP header and no data. The HT-STF and the HT-LTF portions of the frame may also be removed. The duplex capability of the device is encoded in the reserved bit of the HT-SIG field as shown in FIG. 3. Other bits in the HT-SIG fields may be used to encode base station coloring, a direction of the transmission of the frame (e.g., from station to access point or vice versa), the receiving device's identifier, the access point's identifier, bandwidth indication, and so on. The length of the TXOP is encoded in the L-SIG field.

FIG. 5B illustrates an NDP duplex sync frame 550 constructed in accordance with 8002.11ac. The NDP duplex sync frame 550 includes a PLCP header and no data. The duplex capability of the device is encoded in one of the reserved bits of the VHT-SIG fields as shown in FIG. 4. The length of the TXOP is encoded in the L-SIG field. Other bits in the VHT-SIG fields may be used to encode base station coloring, a direction of the transmission of the frame (e.g., from station to access point or vice versa), the receiving device's identifier, the access point's identifier, bandwidth indication, and so on. The length of the TXOP is encoded in the L-SIG field. An NDP duplex sync frame based on physical technology other than 802.11n and 802.11ac is also possible.

FIG. 5C illustrates how the NDP duplex sync frame is used to coordinate full duplex communication between station 1 and an access point. After waiting a backoff period to ensure that no other devices are communicating in a channel, station 1 determines that it can grant itself a TXOP. When the TXOP begins, station 1 sends an NDP duplex sync frame (DSF) request to the access point. The DSF request can be either the NDP duplex sync frame 500 or the NDP duplex sync frame 550. Recall that an NDP duplex sync frame specifies duplex capability as well as TXOP length. In response, the access point sends an NDP duplex sync frame response to station 1. The NDP duplex sync frame response can be either the NDP duplex sync frame 500 or the NDP duplex sync frame 550. In one embodiment, the NDP duplex sync frame response is the header of the PPDU transmitted by the access point to station 1.

After receiving the NDP duplex sync frame response, station 1 transmits, in full duplex mode, a PPDU that includes "Data 1" to the access point. The PPDU itself is unmodified and can be in any 802.11 format. Simultaneously, the access point transmits, in full duplex mode, the PPDU that includes "Data 2" to station 1. In one embodiment, Station 1 determines how much data to include in the PPDU based on the duration of the TXOP and the access point follows Station 1's decision. In another embodiment, Station 1 and the access point each determine how much data to include in the PPDU they send based on the duration of the TXOP. When the access point has successfully received the PPDU, the access point sends an ACK to station 1. When station 1 has successfully received the PPDU, station 1 sends an ACK to the access point. If time remains in the TXOP, as specified in the L-SIG field of the NDP duplex sync frame request, subsequent PPDUs containing "Data 3" and "Data 4" can also be exchanged in full duplex mode. The sequence of PPDU exchanges illustrated in FIG. 5 also apply when the access point sends an NDP sync frame request to Station 1 and Station 1 responds with an NDP sync frame response.

Figure 6A:
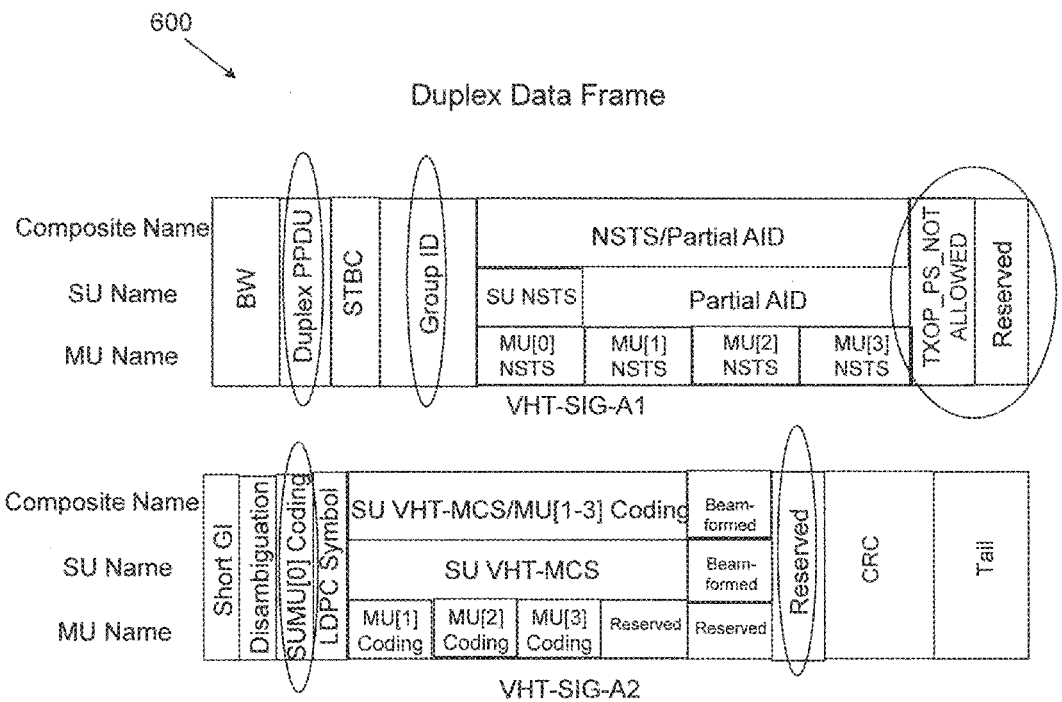
FIGS. 6A and 6B illustrate one embodiment of a duplex frame that comprises a data frame that includes a duplex header.
Figure 6B:
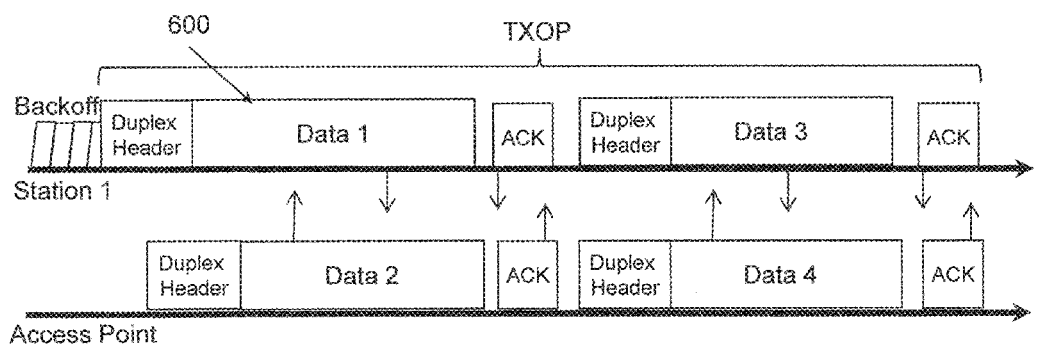

FIGS. 6A and 6B illustrate one embodiment of a "duplex PPDU" 600 that includes a duplex data frame. The duplex data frame is in the data portion of a duplex PPDU that contains the MAC data frame to be transmitted and the duplex PPDU includes the duplex communication information in the PLCP header and the duplex data frame. FIG. 6A illustrates a PHY header of the duplex PPDU 600 constructed in accordance with 802.11ac which is defined as a duplex header. The duplex data PPDU 600 includes a modified PLCP header (called a duplex header in the Figures as defined in FIG. 6A) and data which includes one or more frames. Duplex communication enabling information is encoded in the various bits of the VHT-SIG fields as shown in FIG. 6A. In particular, the second field of the VHT-SIG-A1 encodes duplex capability. Other circled sets of bits in the VHT-SIG-A fields may be used to encode base station coloring, a direction of the transmission of the frame (e.g., from station to access point or vice versa), the receiving device's identifier, the access point's identifier, and so on. The length of the TXOP is encoded in the L-SIG field or in the frame header. A duplex data PPDU based on physical technology other than 802.11n and 802.11ac is also possible.

FIG. 6B illustrates full duplex communication between Station 1 and an access point using duplex data packets. After waiting a backoff period to ensure that no other devices are communicating in a channel, station 1 determines that it can grant itself a TXOP. When the TXOP begins, Station 1 sends, to the access point, a duplex data PPDU 600 with "Data 1" (duplex frame) and having the modified "duplex" header shown in FIG. 6A. After receiving the duplex header portion of the duplex data PPDU 600, the access point is aware that full duplex mode is in use and also knows the length of the PPDU and the TXOP. The access point transmits, in full duplex mode, a duplex data PPDU that includes "Data 2" (duplex frame) to Station 1. Station 1 and the access point each determine how many frames they can send based on the duration of the TXOP. In one embodiment, Station 1 determines how many frames or PPDUs can be sent based on the duration of the TXOP and the access point follows Station 1's decision.

When the access point has successfully received the PPDU, the access point sends an ACK to station 1. When station 1 has successfully received the PPDU, station 1 sends an ACK to the access point. If time remains in the TXOP, as specified in the L-SIG field or the Duration field of the duplex data frame carried in the duplex PPDU 600, subsequent duplex PPDUs containing "Data 3" and "Data 4" can also be exchanged in full duplex mode. In one embodiment, the duplex mode specified in the first PPDU is used throughout the entire TXOP. In another embodiment, each PPDU includes duplex information for the given PPDU.

Figure 7A:
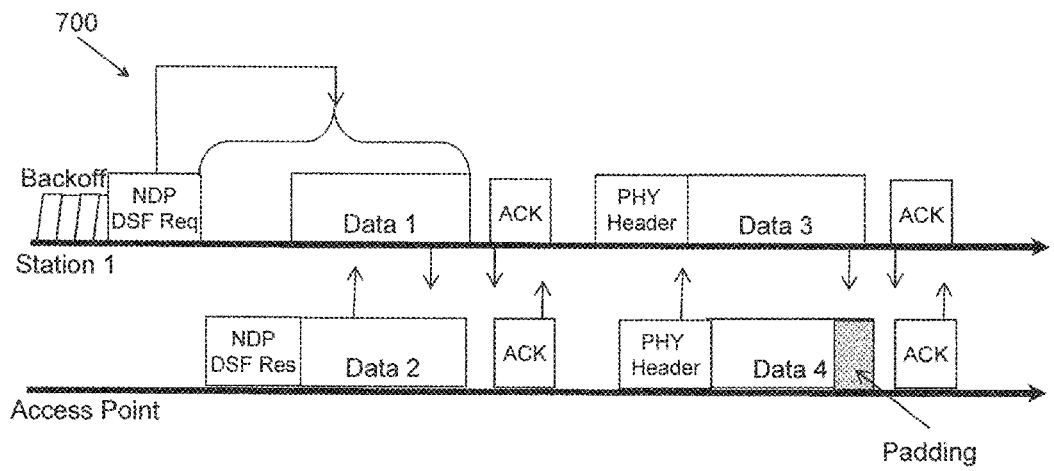
FIGS. 7A and 7B illustrate two examples of full duplex communication using duplex frames.
Figure 7B:
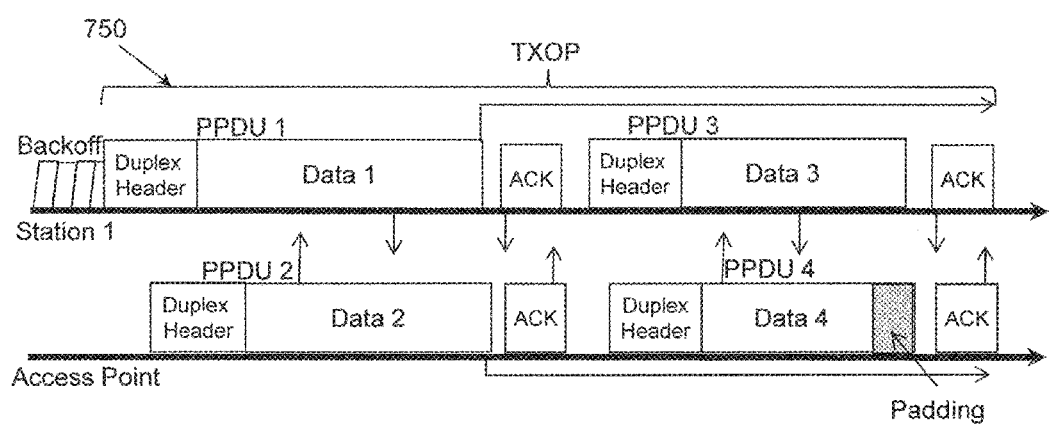

FIGS. 7A and 7B illustrate full duplex communication in which the TXOP holder (e.g., station 1 in FIGS. 7A and 7B) controls the length of the PPDUs. In full duplex communication 700 of FIG. 7A, the NDP duplex sync frame request specifies the length of each PPDU in the TXOP. In the second exchange of frames, the access point inserts padding data into the PPDU to conform to the specified PPDU length. In full duplex communication 750 of FIG. 7B, each duplex data frame that is carried by a duplex PPDU exchanged during the TXOP specifies the length of the individual duplex PPDU. In the second exchange of frames, the access point determines the length of the PPDU 3 from the Duplex header in the PPDU 3 received from station 1 and inserts padding data into PPDU 4 to conform to the specified PPDU length of PPDU 3.

Figure 8:
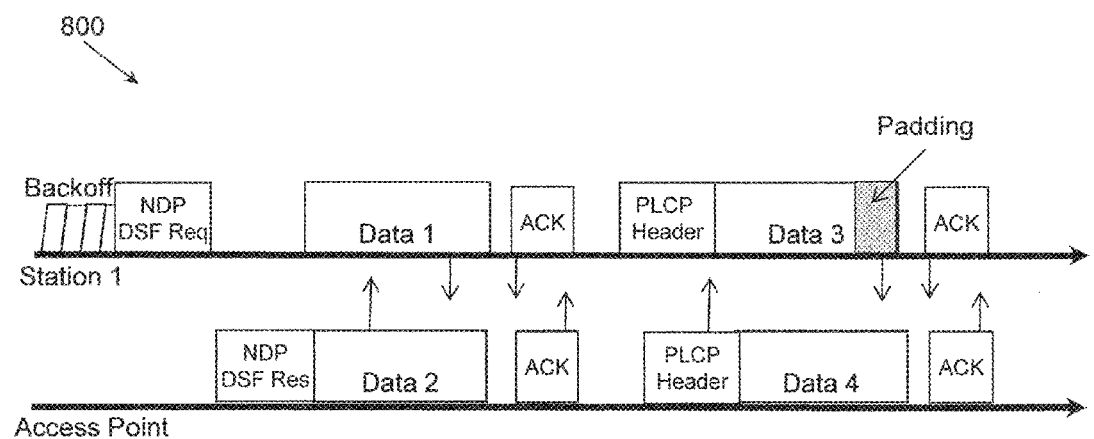
FIG. 8 illustrates another example of full duplex communication using duplex frames.

FIG. 8 illustrates full duplex communication 800 in which either the TXOP holder (e.g., station 1 in FIG. 8) or the TXOP responder (e.g., access point in FIG. 8) decides the length of each PPDU transmitted during the TXOP. The length of each PPDU is specified by each device in the NDP duplex sync frame and the longer length is used. In FIG. 8, the access point specifies a longer PPDU length in the NDP duplex sync frame response than the PPDU length specified by station 1 in the NDP duplex sync frame request. In the second exchange of frames, station 1 inserts padding data into station 1's PPDU to conform to the PPDU length specified by the access point. The technique illustrated in FIG. 8 allows full duplex devices to take full advantage of full duplex communication during a TXOP. In one embodiment, each duplex PPDU indicates its length through the PHY header.

Figure 9:
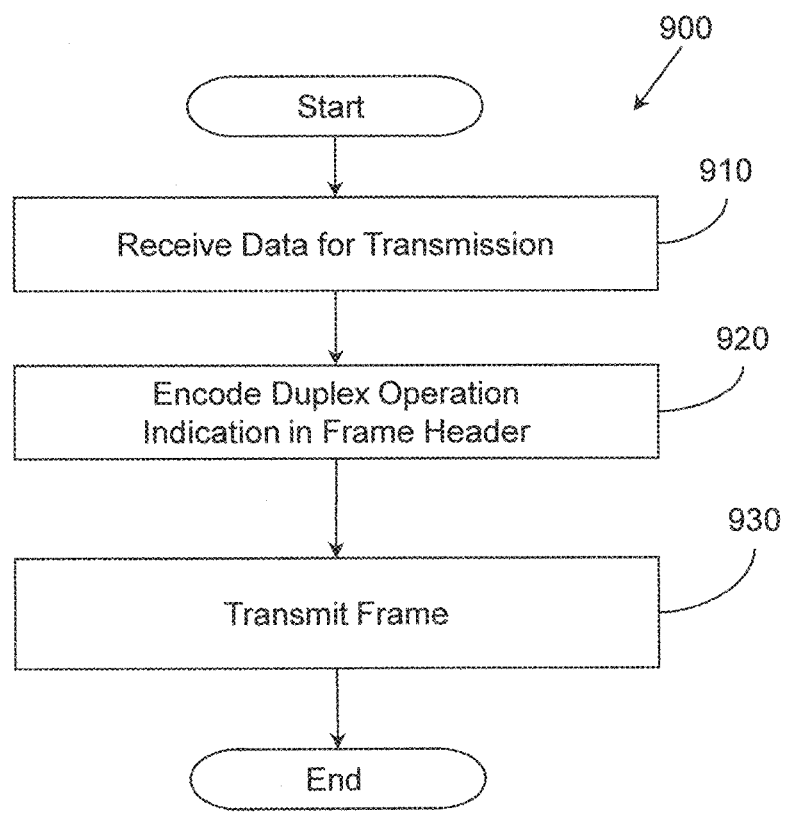
FIG. 9 illustrates one embodiment of a method associated with full duplex communication using duplex frames.

FIG. 9 illustrates one embodiment of a method 900 for using duplex frames for full duplex communication. In one embodiment, the method 900 is performed by the duplex logic 220 of FIG. 2. The method 900 includes, at 910, receiving data to be transmitted by a transceiver. At 920, the method includes generating a header for a frame, where the header includes at least one bit that indicates whether or not full duplex communication should be used. At 930, the method includes providing the frame to the transceiver to transmit the frame.

In one embodiment, the method also includes receiving a frame having a header from a device; analyzing the header to determine if the device allows duplex operation in the present TXOP; and when the at least one bit indicates that the device allows full duplex transmission in the TXOP, transmitting a frame that includes the data to the device while receiving a frame from the device.

Figure 10A:
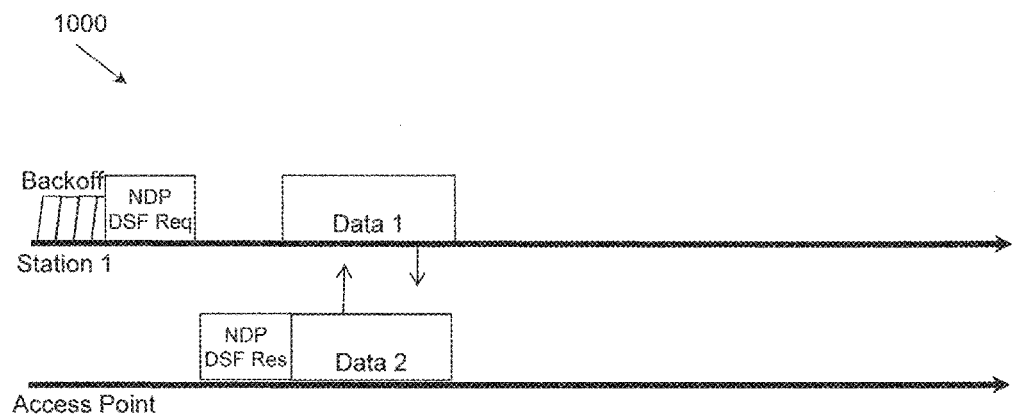
FIGS. 10A and 10B illustrate two examples of full duplex communication using duplex frames and without acknowledgement frames.
Figure 10B:
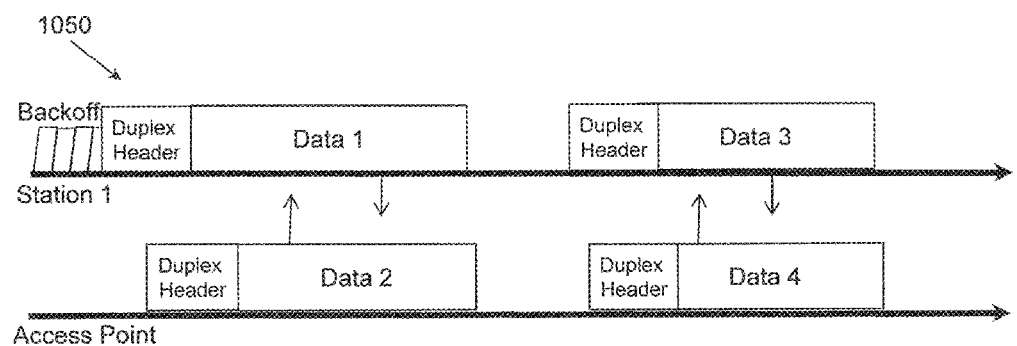

FIGS. 10A and 10B illustrate how duplex frames can be used to coordinate full duplex communication between station 1 and an access point without using an ACK frame to confirm successful receipt of a frame. The technique illustrated in FIGS. 10A and 10B can be used in situations when successful receipt of a frame is a very good indicator that the frame that was sent at the same time (e.g., in full duplex mode) was also received successfully. If such an assumption is reasonable, ACK frames are not necessary. One way to determine the reliability of communication in a channel is the MCS value, which can be found in the headers of duplex frames. When the MCS value is below a threshold, meaning there is a relatively low frame error rate, an ACK frame can be deemed unnecessary.

In FIG. 10A, after waiting a backoff period to ensure that no other devices are communicating in a channel, station 1 determines that it can grant itself a TXOP. When the TXOP begins, station 1 sends an NDP duplex sync frame (DSF) request to the access point. In response, the access point sends an NDP duplex sync frame response to station 1. After receiving the NDP duplex sync frame response, station 1 transmits, in full duplex mode, a PPDU that includes "Data 1" to the access point. Simultaneously, the access point transmits, in full duplex mode, the PPDU that includes "Data 2" to station 1. When the access point has successfully received the PPDU with Data 1 from station 1, the access point determines that the PPDU with Data 2 was successfully received by station 1. When station 1 has successfully received the PPDU with Data 2, station 1 determines that the PPDU with Data was successfully received by the access point. Thus, the determination of successful receipt of a frame by a full duplex partner is based on the successful receipt of a frame from the partner, and not an ACK frame.

FIG. 10B illustrates full duplex communication without an ACK frame between station 1 and an access point using duplex data packets. After waiting a backoff period to ensure that no other devices are communicating in a channel, station 1 determines that it can grant itself a TXOP. When the TXOP begins, station 1 sends, to the access point, a duplex data frame corresponding to a PPDU with "Data 1" and having the modified "duplex" header shown in FIG. 6A. After receiving the duplex header portion of the duplex data frame 600, the access point is aware that full duplex mode is in use and also the length of the TXOP. The access point transmits, in full duplex mode, a duplex data frame that includes "Data 2" to station 1. When the access point has successfully received the PPDU with Data 1, the access point determines that the PPDU with Data 2 was successfully received by station 1. When station 1 has successfully received the PPDU with Data 2, station 1 determines that the PPDU with Data 1 was successfully received by the access point. If time remains in the TXOP, subsequent PPDUs containing "Data 3" and "Data 4" can also be exchanged in full duplex mode without the use of ACK frames. In one embodiment, the duplex mode specified in the first PPDU is used throughout the entire TXOP. In another embodiment, each PPDU includes duplex information for the given PPDU.

Figure 11:
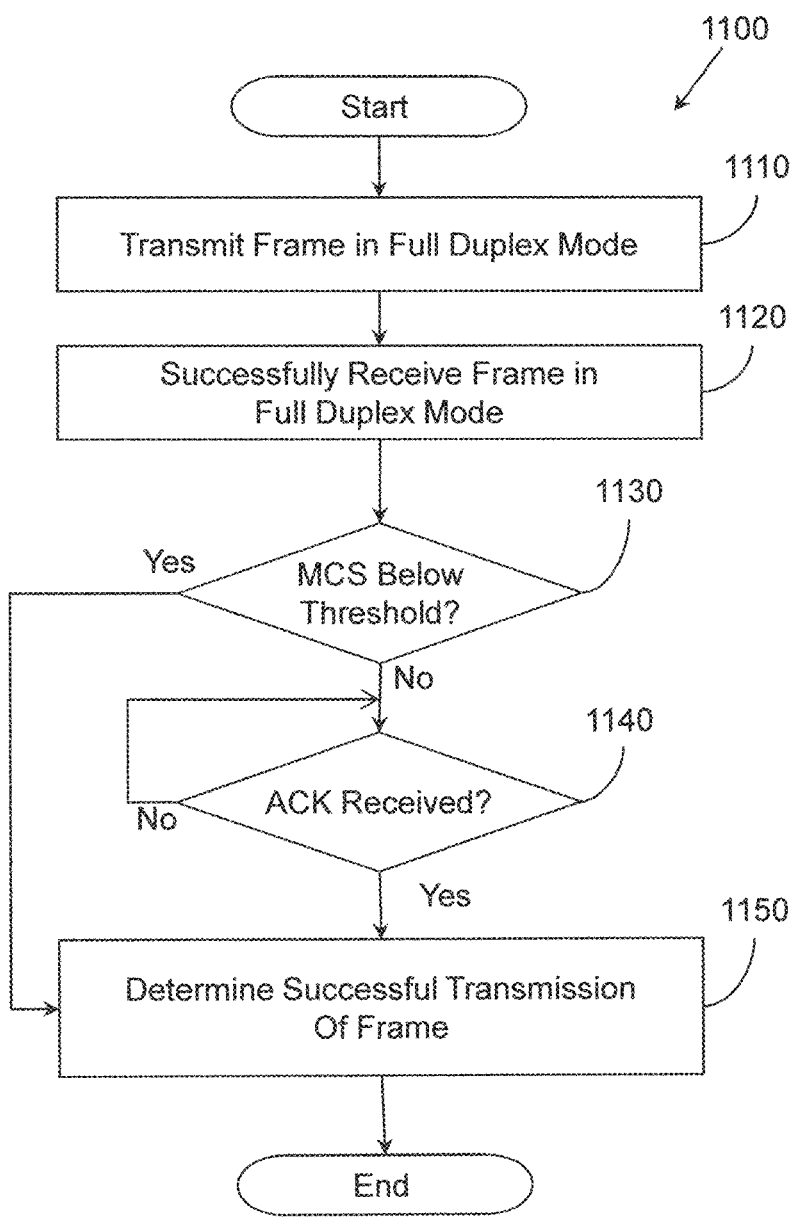
FIG. 11 illustrates one embodiment of a method associated with full duplex communication using duplex frames and without acknowledgement frames.

FIG. 11 illustrates one embodiment of a method 1100 for full duplex communication without an ACK frame. In one embodiment, the method 1100 is performed by the duplex logic 220 of FIG. 2. The method includes, at 1110 transmitting a first frame in full duplex mode. At 1120, a second frame is successfully received in full duplex mode. At 1130, a determination is made as whether the MCS is below a threshold. If the MCS is below the threshold, a determination of successful transmission of the first frame is made at 1150. If the MCS is above or equal to the threshold, at 1140 the method waits for an ACK from the device to which the first frame was transmitted before determining successful transmission of the first frame at 1150.

Figure 12:
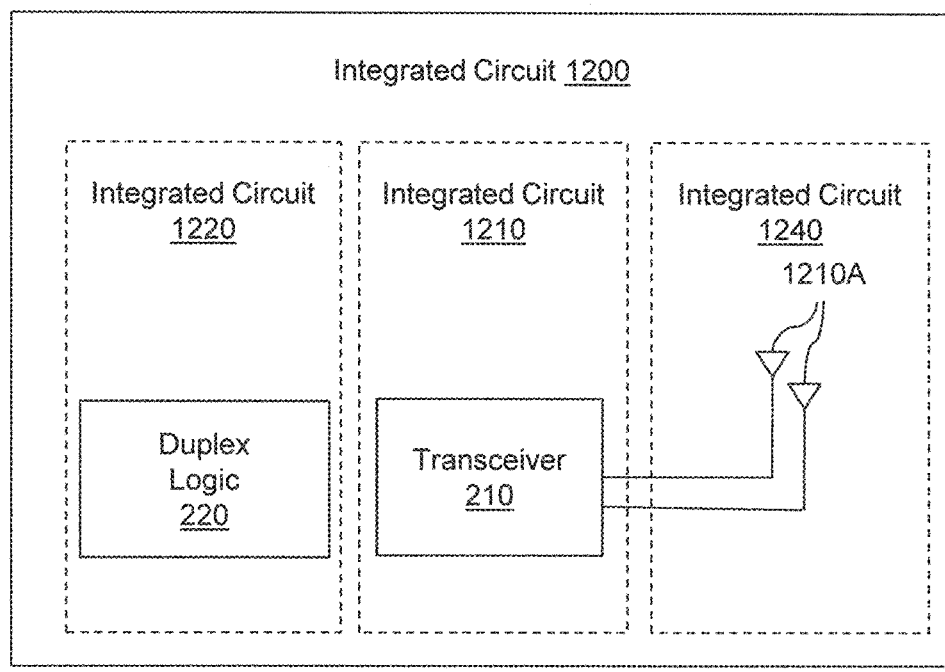
FIG. 12 illustrates one embodiment of an integrated circuit that communicates in full duplex mode using duplex frames.

FIG. 12 illustrates one embodiment of an integrated circuit 1200 that performs full duplex communication using duplex frames. In one embodiment the integrated circuit embodies the apparatus 200 of FIG. 2. The integrated circuit 1200 includes a first integrated circuit 1210 that includes the transceiver 210 (see FIG. 2). Because it supports full duplex communication, the transceiver 210 includes a separate transmitter and receiver (not shown) as well as at least two antennas. The integrated circuit 1200 includes a second integrated circuit 1220 that includes duplex logic 220 (see FIG. 2). The integrated circuit 1200 also includes a third integrated circuit 1240 that includes an antenna 1210A. The duplex logic 220 is configured to encode and decode duplex communication related information in a frame header of a duplex frame. The duplex logic 220 is also configured to control the transceiver 210 to transmit and receive frames in full or half duplex mode based, at least in part, on the headers of duplex frames.

As can be seen from the foregoing description, duplex communication related information can be encoded in a frame header to create a duplex frame that supports full duplex communication.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
a transceiver; and
duplex logic including at least hardware connected to the transceiver, wherein the hardware is configured to:
receive data to be transmitted by the transceiver to a device, wherein the device is a remote device;
generate a PHY header for a frame, where the PHY header includes at least a PHY Signal field that stores at least one reserved bit;
set the at least one reserved bit in the PHY Signal field that encodes information used to enable full duplex communication with the device; and
provide the frame to the transceiver to transmit the frame to the device wherein the at least one reserved bit causes the device to communicate using full duplex communications.

2. The apparatus of claim 1, wherein the duplex logic is further configured to:
receive a frame from the device, where the frame includes a header and a PHY Signal field;
analyze the header to determine if the device is engaging in full duplex communication by analyzing the PHY Signal field to determine if at least one reserved bit in the PHY Signal field indicates full duplex communication; and
when the at least one bit indicates that the device is engaging in the full duplex communication, transmit a frame that includes the data to the device while receiving a frame from the device.

3. The apparatus of claim 1, wherein the PHY header is a header that conforms to a Physical Layer Convergence Procedure (PLCP) protocol in a Physical Protocol Data Unit (PPDU) that carries the frame.

4. The apparatus of claim 3,
the frame is a frame that includes the data; and
wherein the duplex logic is configured to encode information for establishing full duplex communication in other bits of the PHY Signal field of the PLCP header.

5. The apparatus of claim 3, wherein the duplex logic is further configured to encode a length of a transmit opportunity during which the frame is to be sent in bits in a Legacy-Signal field of the header.

6. The apparatus of claim 1, wherein:
the frame is a null data packet.

7. The apparatus of claim 1, wherein the duplex logic is further configured to:
determine a modulation and coding scheme (MCS) of the apparatus; and
when the MCS is below a threshold, determining that the frame was successfully transmitted to a device in full duplex mode if a frame is successfully received from the device in full duplex mode;

such that the duplex logic does not determine successful transmission based on an acknowledgement (ACK) from the device.

8. A method, comprising:

receiving data to be transmitted by a transceiver of a first device to a second device, wherein the second device is a remote device to the first device;

generating, by the first device, a PHY header for a frame, where the PHY header includes a PHY Signal field that stores at least one reserved bit setting, by the first device, the at least one reserved bit in the PHY Signal field that encodes information used to enable full duplex communication with the second device; and providing the frame to the transceiver to transmit the frame to the second device wherein the at least one reserved bit causes the second device to operate using the full duplex communications with the first device.

9. The method of claim 8, further comprising:

receiving, by the transceiver of the first device, a frame from a third device, where the frame includes a header and a PHY Signal field;

analyzing, by the first device, the header to determine if the third device is communicating in full duplex communication by analyzing the PHY Signal field to determine if at least one reserved bit in the PHY Signal field indicates the full duplex communication; and when the at least one bit indicates that the third device is engaging in the full duplex communication, transmitting, by the first device a frame that includes the data to the third device while receiving a frame from the third device.

10. The method of claim 8, wherein generating the PHY header includes generating the PHY header to conform to a Physical Layer Convergence Procedure (PLCP) protocol in a Physical Protocol Data Unit (PPDU) that carries the frame.

11. The method of claim 10, wherein:

the frame is generated as a frame that includes the data; and the method includes encoding information for establishing full duplex communication in other bits of the PHY Signal field of the PLCP header.

12. The method of claim 10, further comprising encoding, in bits in a Legacy-Signal field of the PHY header, a length of a transmit opportunity during which the frame is to be transmitted to the second device.

13. The method of claim 8, wherein:

the frame is generated as a null data packet (NDP).

14. The method of claim 8, further comprising:

determine a modulation and coding scheme (MCS) of the first device; and when the MCS is below a threshold, determining that the frame was successfully transmitted to the second device using the full duplex communication if a second frame is successfully received from the second device using the full duplex communication;

such that successful transmission is not determined based on an acknowledgement (ACK) from the second device.

15. A integrated circuit device comprising:

a first integrated circuit comprising a transceiver configured to operate in either a half duplex mode or a full duplex mode; and a second integrated circuit comprising duplex logic configured to:

encode reserved bits that indicate full duplex communication in a header of frames transmitted by the transceiver to a second device and decode reserved bits that indicate full duplex communication from a header of frames received by the transceiver, wherein the second device is a remote device; and control the transceiver to operate in either the full duplex mode or in the half duplex mode, based at least in part, on values of the reserved bits in the frames received by the transceiver from the device; and wherein the duplex logic is further configured to:

cause the transceiver to transmit a first frame using full duplex mode to the device;

determine that the first frame was successfully transmitted to the device using the full duplex mode if a second frame is successfully received from the device in the full duplex mode;

such that the duplex logic does not determine successful transmission based on receiving an acknowledgement (ACK) frame from the device.

16. The integrated circuit device of claim 15, wherein the header is a PHY header that conforms to a Physical Layer Convergence Procedure (PLCP) protocol in a Physical Protocol Data Unit (PPDU) that carries the frame.

17. The integrated circuit device of claim 16, wherein:

the frame is a null data packet (NDP); and the bit comprises a reserved bit in a related PHY Signal field of the PLCP header.

18. The integrated circuit device of claim 16, the frame is a frame that includes the data;

the bit comprises a reserved bit in a related PHY Signal field of the PLCP header; and wherein the duplex logic is configured to encode information related to full duplex communication in other bits of the related PHY Signal field of the PLCP header.

19. The integrated circuit device of claim 16, wherein the duplex logic is further configured to encode a length of a transmit opportunity during which the frame is to be sent in bits in a Legacy-Signal field of the header.

20. The integrated circuit device of claim 15, wherein the duplex logic is further configured to:

determine a modulation and coding scheme (MCS) of the transceiver; and when the MCS is below a threshold, determining that the first frame was successfully transmitted to the device in the full duplex mode if the frame is successfully received from the device in the full duplex mode.

* * * * *